Dec. 19, 1933.    J. H. BORDEN    1,939,656
METHOD OF AND APPARATUS FOR LANDING CARS
Filed Nov. 10, 1931    3 Sheets-Sheet 1

INVENTOR.
Joseph H. Borden
BY
Cornelius L. E. Liet
his ATTORNEY.

Dec. 19, 1933. J. H. BORDEN 1,939,656
METHOD OF AND APPARATUS FOR LANDING CARS
Filed Nov. 10, 1931 3 Sheets-Sheet 2

INVENTOR.
Joseph H. Borden
BY
Cornelius D. Ehret
his ATTORNEY.

Dec. 19, 1933.   J. H. BORDEN   1,939,656
METHOD OF AND APPARATUS FOR LANDING CARS
Filed Nov. 10, 1931   3 Sheets-Sheet 3

INVENTOR.
BY Joseph H. Borden
Cornelius L. Ebet
His ATTORNEY

Patented Dec. 19, 1933

1,939,656

UNITED STATES PATENT OFFICE 1,939,656

METHOD OF AND APPARATUS FOR LANDING CARS

Joseph H. Borden, Philadelphia, Pa., assignor to Atlantic Elevator Company, Philadelphia, Pa., a corporation of Pennsylvania Application November 10, 1931
Serial No. 574,115

30 Claims. (Cl. 172—152)

My invention relates to a method of and apparatus for controlling and accurately stopping a car, irrespective of its load, at a desired point, and particularly to elevator cars in which the landing or stopping of the car at one or more floor levels is automatically controlled.

In accordance with my invention, the power supplied to the driving or hoisting means for an elevator car is cut off upon the arrival of the car at a point whose distance from the landing level of a desired floor is dependent upon the load on the car, and its direction of travel, to cause the car to make an accurate landing; more particularly, the time of actuation of the switch structure controlling the power supplied to the driving or hoisting motor is advanced or retarded in accordance with the amount of electric power at the time supplied to the motor; specifically, the power supplied is measured by a torque motor, or motor of the wattmeter type, or equivalent, the extent of whose deflection or rotor movement controls the time of rupture of the hoisting motor circuit.

Further in accordance with the invention, braking means for decelerating the elevator car are automatically applied at the time of rupture of the driving motor circuit, and the time of application of the braking means is therefore dependent upon the amount of electric power at the time supplied to the motor; specifically, the braking means may comprise a mechanical or friction brake and/or electrical braking means, for example, electrodynamic, regenerative, or equivalent, and the electrical and mechanical brakes may be complementary or cumulative in their action, the mechanical braking action preferably preponderating at low speed and the electrical braking action preponderating at high speed.

With a given power input to the driving or hoisting motor, the point of cut-off is also varied, dependent upon whether the elevator car is traveling up or down, to compensate for the difference in the travel or slide of the car after the power is cut off; more particularly, the control structure actuated or controlled by the torque motor or wattmeter has different deflection constants respectively for the upward and downward directions of travel of the car.

Specifically, and in accordance with one form of the invention, the amount of deflection or movement of the rotor of the torque motor, dependent upon the direction of travel of the car and the power input to the hoisting motor, varies the time of actuation of the hoisting motor control switch which is actuated by cam members on a drum connected by a cable to the elevator car or otherwise moving in accord with the car.

Specifically, and in accordance with another form of the invention, the torque motor is mounted on the elevator car, the torque motor varying the position or time of coaction of the elements of an inductor switch, relay or equivalent, which controls the hoisting motor circuit.

My invention resides in the method, construction, combination and arrangement hereinafter disclosed and claimed.

For an understanding of the invention, and for illustration of some of the various forms it may take, reference is had to the accompanying drawings, in which.

Figure 1:
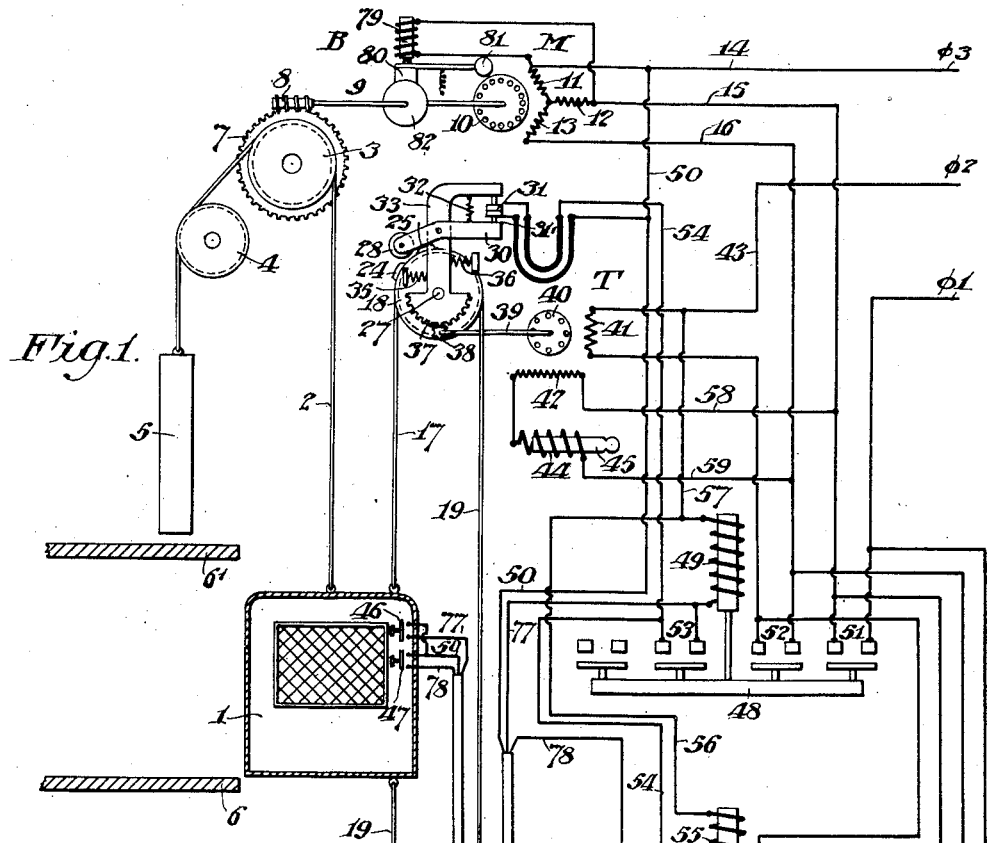
Fig. 1 is a diagrammatic view of an alternating current driven elevator car and control apparatus in accordance with one form of the invention.

Referring particularly to Fig. 1, the invention is shown as applied to a single speed geared elevator system, or to the slow speed part of a two speed system, in which an elevator car 1 has a hoisting cable 2, with a winding drum 3, the cable passing over idler sheave 4, and attached to a counterweight 5. Two floor levels are indicated at 6, 6', between which the car 1 operates, although the system may be used with any number of floors. The winding drum 3 is driven by a worm wheel 7 and worm 8, the worm being driven by shaft 9 connected to an armature, as the squirrel cage rotor 10, of the driving or hoisting motor M. The motor field windings 11, 12, and 13 are energized by means of conductors 14, 15, and 16 through control switch structure to a source of three-phase alternating current.

Figure 2:
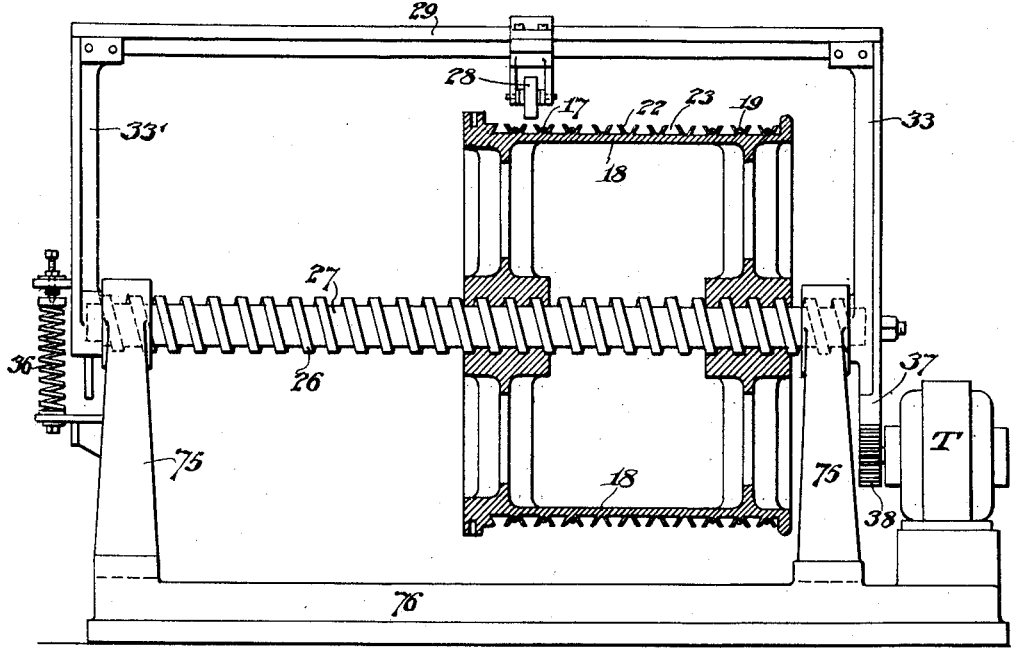
Fig. 2 is a view in front elevation, partly in section, of the control drum employed in the arrangement of Fig. 1.
Figure 4:
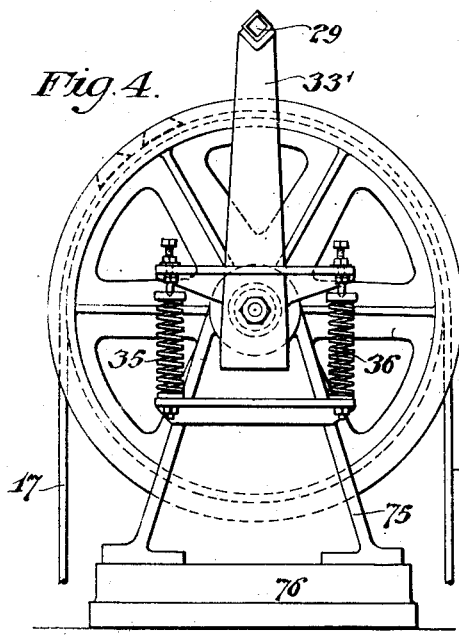
Figs. 3 and 4 are right and left end elevational views of the drum of Fig. 2.

A control cable 17 is also connected to the top of elevator car 1, and leads to a control drum 18 where it is wound around the drum on a helical thread and then secured to one end of the drum. Another control cable 19 is connected to the bottom of the elevator car and leads to the sheave 20 supporting tail weight 21, the cable then passing upward to the control drum 18 where it is also wound around the drum on a helical thread and secured to the end of the drum opposite the end to which control cable 17 is secured. Fig. 2 shows the manner in which the control cables are led to the control drum, and the supporting structure for the drum.

Figure 3:
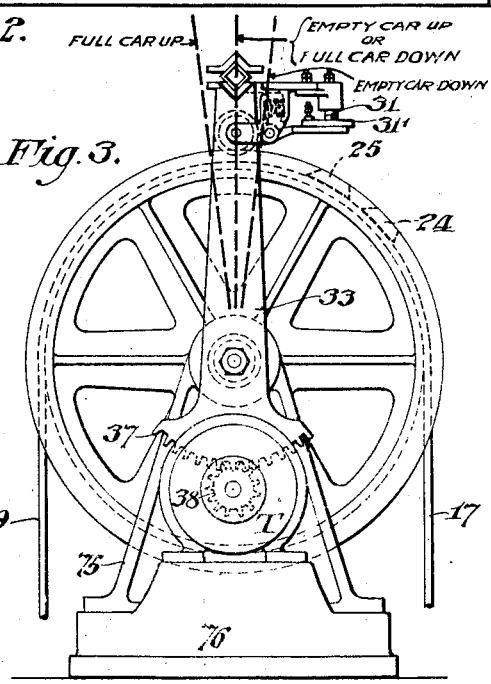

The control drum 18, shown in section in Fig. 2, is supported on a shaft 27, and its peripheral surface comprises a double helix; one lead or helix 22 is used for winding the control cables 17 and 19, while the other lead or helix 23 is a dovetail used for securing cams 24 and 25, shown in detail in Fig. 3, there being one pair of cams for each intermediate floor, and one cam each for the top and bottom floors, the cams being spaced along the helix 23 at points corresponding to the floors. The dovetail 23 is preferably located between the cable lead 22. The drum 18 is arranged for rotation in either direction by the control cables 17 and 19, and also has a horizontal motion along a shaft 27 guided by threads 26, the shaft having the same lead as the dovetail helix 23. The shaft does not rotate, but is fixedly supported at each end by pedestals 75 rising from base plate 76. The arrangement causes a positive positioning of the drum 18 with respect to each position of the elevator car 1 in a manner well known in the art.

A roller 28 is mounted directly over the dovetail helix, being clamped to a supporting bar 29. Since the roller 28 is located directly over the helix 23 it will be successively engaged, as the drum rotates, by the cams 24 and 25 secured in the dovetail helix. Attached to roller 28 is a contact lever 30 on which is mounted an electrical contact 31' which cooperates with a relatively fixed contact 31, the contacts being normally held closed by spring 32.

The contact assembly, including the roller 28 and bar 29, is mounted on arms 33 and 33' which are rotatable as a unit through a limited angle about the shaft 27, the arm 33', and consequently the assembly, being restrained against rotation in either direction by compression springs 35 and 36. The movement of the assembly is effected by a segment of a spur gear 37 on arm 33, and pinion 38, the pinion being mounted on a shaft 39 connected to a rotor 40 of a torque motor T. The torque motor contains stator windings 41 and 42 which are wound 90 electrical degrees apart, as indicated diagrammatically in Fig. 1. The winding 41 is a current winding and is connected in series with one phase or conductor 43 of the alternating current supply line, so that the load current flowing through driving motor M passes through the current winding 41. Winding 42 is a potential winding and is connected by means of conductors 58 and 59 across one phase, or across conductors 15 and 16, of the alternating current supply line so that the voltage across the driving motor M will also be impressed upon the coil 42. The coil is preferably, although not necessarily, connected in series with a reactance 44 having an adjustable core 45. Assuming a load power factor of 100%, the current in coil 41 should lag the current in the potential coil 42 by 90 electrical degrees, and the purpose of the reactance is to adjust the lag of the current in the potential coil 42 so that it will be approximately 90 electrical degrees out of phase with the current in the coil 41. The torque motor T in conjunction with the pinion 38, spur gear 37, lever 33, bar 29, lever 33', and springs 35 and 36 constitute an induction wattmeter, in which the deflection of the contact assembly, with respect to the position of the drum 18 and cams 24 and 25, will vary with the power input to the driving motor M as the elevator approaches the desired floor.

In the example shown in Fig. 1, the elevator is controlled by push buttons, as the up-direction push-button 46 and the down-direction push button 47, the floor selection being made by holding in one of the buttons until the elevator approaches the desired floor, at which time the button is released and the elevator automatically lands at the floor level in the manner hereinafter explained.

Assuming now that the car is loaded and that the operator wishes to move the car upward from landing 6 to landing 6'; he depresses button 46 and holds it until the car approaches the desired floor 6' and then releases the button. The car proceeds to landing 6' and stops automatically, as follows;

When the button 46 is depressed, current flows from line conductor 14, conductor 50, through the now closed contact of button 46, conductor 77, through solenoid winding 49, and returns by conductor 57 to line conductor 43. This energizes the solenoid 49 and causes switch 48 to close, thus closing contacts 51, 52 and 53 to supply current to the driving motor M, and the car moves in an upward direction. As the car is running up fully loaded, the point of cut-off must be shifted closer to the floor level in order to make an accurate landing. This is accomplished by the torque motor T, the rotation or deflection of whose armature 40 causes deflection of the arm 33 and the contact assembly against the resistance of the spring 36. The car is now running at a constant speed in the up direction, and the contact assembly has taken a position in accordance with the power consumed by the driving motor. After the operator releases the button 46, current flows from line conductor 14, through conductor 50, through contacts 31 and 31' of the contact assembly, conductor 54, contact 53 of the up-direction switch, through solenoid winding 49, and wire 57 to line conductor 43. Contacts 51, 52 and 53 of the up-direction switch will thus be held closed until the up cam, as the cam 25, for floor 6' engages the roller 28 and opens the contacts 31 and 31', thereby interrupting the circuit and deenergizing solenoid 49 and opening the up-direction switch and causing the car to stop. It will be seen that with increasing power input to the driving motor and the car running in the up direction, the arm 33 and contact assembly will be displaced in one direction, counter-clockwise as viewed in Fig. 3, the amount of displacement increasing and compressing the spring 36 more as the power input is increased, so that the time of cut-off or rupture of the power supplied to the driving motor is delayed.

Figure 6:
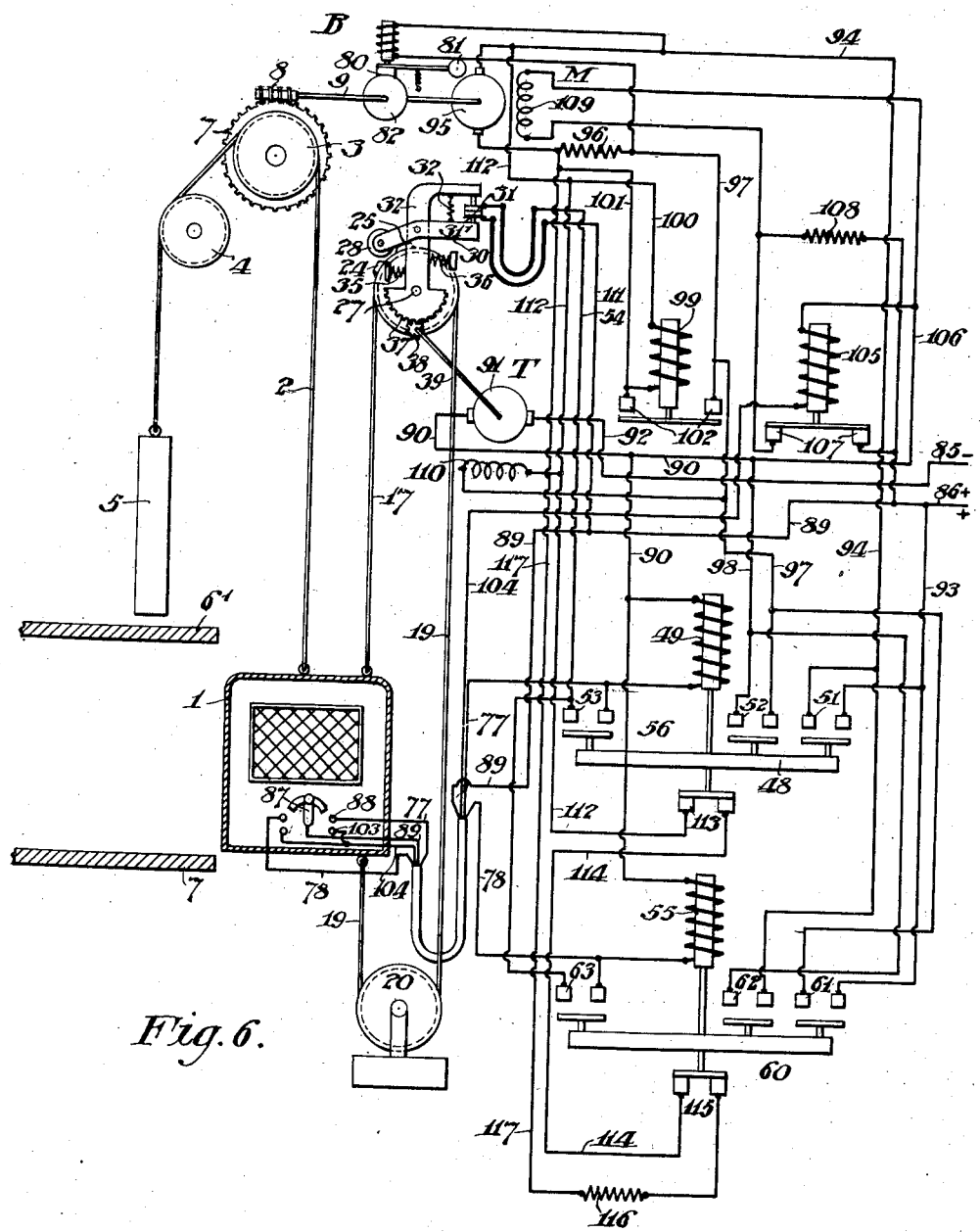
Fig. 6 is a diagrammatic view of a direct current driven elevator car and control apparatus embodying the principles of the invention.

A mechanical brake B comprising a solenoid 79 connected across conductors 14 and 15 to the energizing circuit of driving motor M, prevents brake shoe 80, pivotally mounted at 81, from forcibly bearing on the brake drum 82 secured to shaft 9. At the instant of cut-off or rupture of the driving motor energizing circuit, however, the circuit of solenoid 79 will also be opened, and thus permit brake shoe 80 to forcibly bear on brake drum 82 to decelerate the elevator car and driving system. The brake may comprise any of the well-known types adapted for the purpose. Additional electric braking means (not shown), as the electrodynamic and regenerative brakes hereinafter described with reference to Fig. 6, are also preferably employed.

The operation in the down direction is substantially the same as for the up direction. When the operator depresses the down button 47, this completes a circuit from line conductor 14 of the supply line, conductor 50, through the now closed contacts of button 47, conductor 78, through the winding of solenoid 55, through conductor 56, conductor 57, and return to line conductor 43. The energization of the solenoid 55 operates the down-direction switch 60, thus closing main contacts 61 and 62, and auxiliary contact 63. The closing of the main contacts 61 and 62 causes the supply current to be applied to the driving motor M, but causes a reversal of one-phase of the supply to the driving motor and thus reverses its direction of rotation. This causes a reversal of current through winding 41 of torque motor T, causing its armature 40 to rotate in the opposite direction, and thus cause the arm 33 carrying the contact assembly to rotate in an opposite direction, compressing the spring 35 instead of spring 36. When the elevator car approaches the desired floor in the down direction, the operator releases the push-button 47, and the circuit of solenoid 55 is then established through conductor 50, contacts 31 and 31', conductor 54, and contact 63 of the down direction switch 60. At a distance from the floor level, as determined by the power input at the time supplied to the driving motor, the down-direction cam 24 will engage the roller 28 to open contacts 31 and 31', and thus the down-direction switch will be opened by deenergization of solenoid 55, and open the driving motor circuit. With increasing power input to the driving motor due to the raising of more effective counterweight as the car load is decreased, the arm 33 will be displaced in a clockwise direction, as viewed in Fig. 3, to delay the time of cut-off or rupture of the power supplied to the driving motor.

With a given power input to the driving motor M, the travel or slide of the elevator car, after the power is shut off and the brake applied, also varies, dependent upon whether the elevator is traveling in an up or down direction, so that the point of cut-off should be moved, as the elevator is traveling up or down, for a given power input to the driving motor. This is accomplished by giving the torque motor assembly a different deflection constant for the up direction than for the down direction, by using separate restraining springs 35 and 36 for each direction of travel, and by adjusting each spring to give the proper deflection constant to the arm 33. Fig. 3 illustrates different cut-off points dependent upon the direction of travel of the elevator.

Figure 5:
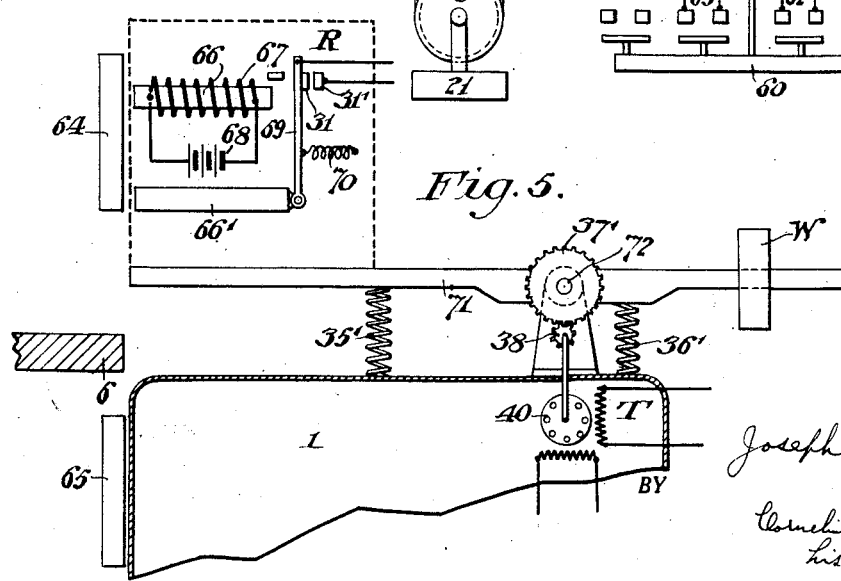
Fig. 5 is a diagrammatic elevational view of an elevator car equipped with a modified form of the control apparatus.

Fig. 5 shows a modified form of my invention which is preferably used with control systems employing inductor type control apparatus. In such systems, inductor means, as metallic plates 64 and 65 are spaced above and below the landing level of a floor 6, and inductor apparatus on the elevator car is actuated as it passes these inductor plates. In the illustration of Fig. 5, there is shown diagrammatically an inductor relay, greatly enlarged, comprising cores 66 and 66' which form an open magnetic circuit, the core 66 being surrounded by an energizing solenoid coil 67 which may be constantly energized as from a source of current 68, or the coil may be energized only when the elevator car is in motion. As long as the magnetic circuit of the cores 66 and 66' of relay R is open, the armature 69 which is normally resiliently restrained by spring 70 in a position to maintain contacts 31 and 31' closed, will be unaffected by the current flowing through coil 67 because of the high reluctance of the air gap between the cores. When the car in traveling approaches a floor, this causes the relay R to pass one of the plates 64 or 65, at which time such plates form a closed magnetic circuit at the adjacent ends of core members 66 and 66', and the reluctance of the magnetic circuit is lowered thereby so that armature 69 is attracted to core 66, thus opening contacts 31 and 31' to deenergize the driving motor as in the system of Fig. 1. The relay R is carried by a lever arm 71 which is pivotally mounted at 72 and is adapted to rotate against the action of restraining springs 35' and 36'. Attached to the lever 71 is a gear 37', the gear being rotated by a pinion 38 connected to the armature 40 of a torque motor T which functions in the same manner as the torque motor of Fig. 1. As the arm 71 is rotated in either clockwise or counter-clockwise direction, depending upon the displacement or rotation of the armature 40, of the torque motor, the time of actuation of the relay armature 69 will be advanced or delayed, as the case may be, and thus the time of cut-off of the driving motor energizing circuit may be controlled in the same manner as above described with reference to the system of Fig. 1.

In the examples above given, three-phase alternating current is shown as furnishing the power supply for the driving motor M, but alternating currents other than three-phase, such as single-phase or two-phase, may also be employed. The manner of connecting a torque motor to measure the power input to a driving motor energized by any of these systems is well known in the art, and need not be explained here. Also, the elevator may be of the gearless type, instead of the gear driven type shown. In the gearless type, if the driving motor is of the type such that its power input passes through zero when the car is traveling in the down direction, a third coil may be used in the torque motor T to load up the torque motor so that it will always deflect in the same direction but on either side of a given point, depending upon the direction of travel of the elevator car. In two-speed elevator systems, the torque motor or wattmeter will be connected to the slow-speed part of the driving motor control circuit.

While manually operated push-buttons are shown for the purpose of simplicity in explaining the invention, it will be understood that the up and down buttons 46 and 47 may be replaced by the various automatic push button control systems known in the art.

Fig. 6 shows the invention as applied to a direct current driving or hoisting motor circuit, and employing mechanical, electrodynamic, and regenerative braking means. In this arrangement, the driving or hoisting motor M is energized from the direct current mains 85 and 86, and the torque motor T is adapted to measure the electrical power input to the hoisting motor and cause its armature to rotate in either direction dependent upon the direction of travel of the elevator car.

The operation of the system is as follows:
Assume, for example, that the operator wishes to run the elevator car 1 up from landing level 6 to level 6'; the controller handle of the car switch 87 is first moved in a clockwise direction, to engage the slow speed contact 88 for the up direction, and thus close a circuit from the positive side 86 of the supply line, conductor 89, switch blade 87 and contact 88, conductor 77, solenoid winding 49 of the up-direction switch 48, conductor 90, through the armature 91 of torque motor T, and conductor 92 to the negative side 85 of the supply line. The up-direction switch 48 is thereby closed due to the energization of solenoid 49, and closes its contacts 51, 52 and 53, thus applying current to the hoisting motor armature, the circuit being completed from positive side 86 of the supply line, conductor 93, through the now closed contacts 51, conductor 94, through the armature 95 of the driving motor M, through starting resistance 96, conductor 97, through the now closed contacts 52 of the up-direction switch, conductor 98, conductor 90, through the torque motor armature 91, conductor 92 and return to the negative side 85 of the supply circuit. The field of the driving motor is connected across the line on slow speed. The circuit is from the positive side 86 of the supply line, through closed contact 107 of the high speed relay, driving motor shunt field 109, conductor 106, conductor 90, torque motor armature 91, and return to the negative side 85 of the supply line. The elevator car will now accelerate, and when its armature voltage or counter electromotive force builds up, a relay 99, connected by conductors 100 and 101 across the armature 95, will energize and close its contacts 102, thus shorting out the starting resistance 96.

The operator may now move the controller handle to the high speed contact 103. Current will then flow from the positive side 86 of the supply line through conductor 89, switch blade 87 and contact 103, conductor 104 to high speed relay energizing coil 105, conductor 106, conductor 90, torque motor armature 91, and conductor 92 to return to the negative side 85 of the supply circuit. The high speed relay will thus be energized, and will open its normally closed contacts 107, thus removing a shunt circuit and inserting field resistance 108 in series with the hoisting motor field winding 109, and the elevator will accelerate to full speed.

As the elevator car approaches the desired landing 6', the operator returns the controller handle to the slow speed position. This will deenergize relay coil 105, and cause its normally closed contacts 107 to again shunt out field resistance 108, thus causing the hoisting motor M to decelerate to slow speed by means of a regenerative braking action, the motor acting as a generator and returning a part of the stored energy back to the supply line. The regenerative system is preferably of the type disclosed in my copending application, Serial No. 498,955, filed November 29, 1930.

With the elevator car now running at low speed, the torque motor T will measure the electrical power input to the main motor, since its armature 91 is connected in series with the supply circuit to the hoisting motor armature 95, and its coil 110 is connected across the hoisting motor armature, and the cut-off point or time of rupture of the hoisting motor circuit will be varied accordingly, in the same manner as described with reference to the system of Fig. 1. After the operator returns the controller hand to the off-position, the up-direction switch 48 will be held in by reason of the closed circuit from the positive side 86 of the power supply line, conductor 89, conductor 111, contacts 31 and 31', conductor 54, through contacts 53 of the up-direction switch, energizing coil 49, conductor 90, arma-ture 91 of the torque motor, and return through conductor 92 to the negative side 85 of the supply circuit. When contacts 31 and 31' open, due to engagement of roller 28 with up-direction cam 25 corresponding to the desired floor, the solenoid 49 will be deenergized, switch 48 will open and power will be cut off from the hoisting motor circuit. The elevator will then be stopped by the combined action of the mechanical brake B and the electro-dynamic brake circuit.

The circuit from the electrodynamic brake comprises a conductor 112 connected to one side of hoisting motor armature 95, through normally closed contacts 113 of up-direction switch 48, conductor 114, through normally closed contacts 115 of the down-direction switch 60, through dynamic braking resistance 116, and conductor 117, back to the other side of armature 95 of the hoisting motor M. Thus, when the energizing circuit of the hoisting motor is ruptured, the energy stored due to inertia of the elevator car and driving mechanism is partially dissipated by the mechanical brake 79, and partially in the dynamic braking resistance 116.

In order to run the car downward, the operator moves the controller counter-clockwise; a circuit is closed through solenoid 55 of down-direction switch 60, and the closing of its contacts 61 and 62 causes the supply current to be applied to the armature of the driving motor M in a reverse direction, thus reversing its direction of rotation to drive the elevator car downward. This also causes current to flow through the armature of the torque motor in reverse direction and cause its deflection or rotation in a corresponding direction.

The torque motor T may comprise a direct current shunt wound motor of the usual type, with its armature wound for low voltage, and its shunt field adapted for connection across the supply line. The entire line current may be carried by the armature, as shown, or a shunt may be used to by-pass a portion of the current. While a manual controller only is shown, it will be understood that the various automatic push button control systems known in the art may be connected to, and supplement or displace the manual arrangement shown.

What I claim is:
1. In the art of controlling elevator cars or the like, the method of accurately stopping the car irrespective of magnitude of its load at a desired point, which comprises discontinuing application of driving power to the car motor upon arrival of the car at a point whose distance from said desired point is dependent upon the amount of electrical input power applied to said car motor as it approaches said desired point.

2. In the art of controlling elevator cars or the like, the method of accurately stopping the car irrespective of magnitude of its load at a desired point, which comprises discontinuing application of driving power to the car motor upon arrival of the car at a point whose distance from said desired point is dependent upon the amount of electrical power applied to said car motor as it approaches said desired point, and simultaneously braking the car to decelerate and stop the same at said desired point.

3. In the art of controlling elevator cars or the like, the method of accurately stopping the car irrespective of magnitude of its load at a desided point, which comprises discontinuing application of driving power to the car motor upon approach to said desired point, and determining, in accordance with the amount of input power applied to the car motor as the car approaches said desired point, the point in its travel at which discontinuance of application of power thereto is effected.

4. In the art of controlling elevator cars or the like, the method of accurately stopping the car irrespective of magnitude of its load at a desired point, which comprises discontinuing application of driving power to the car motor upon approach to said desired point, and determining, in accordance with the amount of input power applied to the car motor and its direction of travel, as the car approaches said desired point, the point in its travel at which discontinuance of application of power thereto is effected.

5. In the art of controlling elevator cars or the like driven by an electric motor, the method of accurately stopping the car irrespective of magnitude of its load at a desired point, which comprises varying the application of electric power to said driving motor upon arrival of the car at a point whose distance from said selected point is dependent upon the amount of input power applied to said car motor as it approaches said desired point.

6. In the art of controlling elevator cars or the like driven by an electric motor, the method of accurately landing the car irrespective of magnitude of its load, which comprises deenergizing the driving motor upon approach of the car to a desired floor, and determining, in accordance with the amount of power supplied to the driving motor as the car approaches the desired floor, the point in its travel at which deenergization of said driving motor is effected.

7. In the art of controlling elevator cars or the like driven by an electric motor, the method of accurately landing the car irrespective of magnitude of its load, which comprises deenergizing the driving motor upon approach of the car to a desired floor, and determining, in accordance with the amount of power supplied to the driving motor and the direction of travel of the car as it approaches the desired floor, the point in its travel at which deenergization of said driving motor is effected.

8. In the art of controlling elevator cars or the like driven by an electric motor, the method of accurately landing the car irrespective of magnitude of its load, which comprises opening the driving motor energizing circuit upon the approach of the car to a desired floor, and determining, in accordance with the amount of power supplied to the driving motor as the car approaches the desired floor, the point in its travel at which the driving motor energizing circuit is opened.

9. In the art of controlling elevator cars or the like driven by an electric motor, the method of accurately landing the car irrespective of magnitude of its load, which comprises opening the driving motor energizing circuit upon the approach of the car to a desired floor, and determining, in accordance with the amount of power supplied to the driving motor and the direction of travel of the car as it approaches the desired floor, the point in its travel at which the driving motor energizing circuit is opened.

10. In the art of controlling elevator cars or the like driven by an electric motor, and having electrical and mechanical brakes, the method of accurately landing the car irrespective of magnitude of its load, which comprises opening the driving motor energizing circuit upon the arrival of the car at a point whose distance from the desired floor is dependent upon the amount of the power supplied to the driving motor as it approaches said desired floor, applying said electrical and mechanical brakes to decelerate the car at the time of opening the driving motor circuit, and causing said brakes to be complementary in their action, with the electrical braking action preponderating at higher speeds and the mechanical braking action preponderating at lower speeds of travel of the car.

11. The combination with a car and electrical driving means and braking means therefor, of means dependent upon the electrical power input to the driving means as the car approaches a selected point for completely deenergizing said driving means, and means for simultaneously applying said braking means to decelerate and stop the car at said selected point.

12. The combination with a car and driving means and a mechanical brake therefor, of means dependent upon the electrical power input to the driving means as the car approaches a selected point for completely deenergizing said driving means, and means for applying said mechanical brake at the time of deenergization of said driving means to decelerate and stop the car at said selected point.

13. The combination with a car and electrical driving means and electrical and mechanical braking means therefor, of means dependent upon the electrical power input to the driving means as the car approaches a selected point for completely deenergizing said driving means, and means for simultaneously applying said electrical and mechanical braking means to decelerate and stop the car at said selected point.

14. The combination with a car and electrical driving means and electrical and mechanical braking means therefor, of means dependent upon the electrical power input to the driving means as the car approaches a selected point for completely deenergizing said driving means, means for applying said electrical and mechanical braking means at the time of deenergization of said driving means, and means for causing said electrical braking means to preponderate at high speed and said mechanical braking means to preponderate at low speed.

15. The combination with an elevator car and an electric motor for hoisting the car, of control means for deenergizing the hoisting motor of the car as it approaches the landing level of a desired floor, and means for causing the time of actuation of said control means to vary dependent upon the electric power input to the motor as the car approaches the selected floor.

16. The combination with an elevator car and an electric motor for hoisting the car, of control means opening the circuit of the hoisting motor of the car as it approaches the landing level of a desired floor, and means for causing the time of opening said circuit to vary in accordance with the power input to the motor as the car approaches the selected floor.

17. The combination with an elevator car and an electric motor for hoisting the car, of control means for opening the circuit of the hoisting motor upon arrival of the car at a given distance, dependent upon its load, from the landing level of a desired floor, said means causing the time of opening said circuit to vary in accordance with the power input to the motor, and also in accordance with the direction of travel, as the car approaches the desired floor.

18. The combination with an elevator car and an electric driving motor therefor, of control means for deenergizing the driving motor when the car is at a given distance, dependent upon its load, from the landing level of a selected floor, said means comprising a device connected to the driving motor circuit and adapted to measure the power input to said motor as the car approaches said desired floor, said means causing the time of deenergization of the motor to be advanced or delayed dependent upon the power input to the motor and upon the direction of travel as the car approaches the desired floor.

19. The combination with an elevator car and an electric driving motor therefor, of means for opening the driving motor circuit when the car is at a given distance, dependent upon its load, from the landing level of a desired floor, comprising a device connected to the driving motor circuit and adapted to exert a torque which varies as the power input to the driving motor, and means for varying the time of opening the driving motor circuit in accordance with the torque exerted by said device as the car approaches the desired floor.

20. The combination with an elevator car and an electric driving motor therefor, of means for opening the driving motor circuit when the car is at a given distance, dependent upon its load, from the landing level of a desired floor, comprising a device connected to the driving motor circuit and adapted to exert a torque which varies as the power input to the driving motor, and means for varying the time of opening the driving motor circuit in accordance with the torque exerted by said device as the car approaches said desired floor, and the direction of travel of the elevator car.

21. The combination with an elevator car and an electric driving motor therefor, of a control device which moves in accordance with the car, a plurality of contact actuating means at spaced intervals on said device and respectively corresponding to the different floors, contacts for controlling the driving motor circuit and adapted to be engaged by said actuating means, means comprising a torque motor of the wattmeter type connected in circuit with the driving motor to exert a variable torque having a magnitude and direction dependent upon the power input to the driving motor and the direction of travel of the car, and means for causing the time of engagement of the contact actuating means of a selected floor with said contacts controlling the driving motor to be varied in accordance with the torque exerted by said torque motor.

22. The combination with an elevator car and an electric driving motor therefor, of a control drum which moves in accordance with the car, actuating cams at spaced intervals on the periphery of the drum and respectively corresponding to the different floors, contact means for controlling the driving motor circuit and adapted to be engaged by said cams, means comprising a torque motor of the wattmeter type connected in circuit with the driving motor to exert a variable torque having a magnitude and direction dependent upon the power input to the driving motor and the direction of travel of the car, and means for causing the time of engagement of the cams with said contacts controlling the driving motor to be varied in accordance with the torque exerted by said torque motor.

23. The combination with an elevator car and an electric driving motor therefor, of a control drum having a rotatable and axial movement and whose position corresponds at all times to that of the car, actuating cams at spaced intervals along a helix on the periphery of the drum and respectively corresponding to the different floors, contact means tracking said helix for controlling the driving motor circuit and adapted to be engaged by said cams, means comprising a torque motor of the wattmeter type connected in circuit with the driving motor to exert a variable torque having a magnitude and direction dependent upon the power input to the driving motor and the direction of travel of the car, and means for causing the time of engagement of the cams with said contacts controlling the driving motor to be varied in accordance with the torque exerted by said torque motor.

24. In combination with an elevator car and an electric driving motor therefor, a control drum having a rotatable and axial movement and connected by a cable to the elevator car, the drum having a helical lead on its periphery for said cable, said drum also having spaced contact actuating members on its periphery and disposed in the form of a helix for controlling the energization of the driving motor.

25. In combination with an elevator car and an electric driving motor therefor, a control drum having a rotatable and axial movement and connected by a cable to the elevator car, the drum having a helical lead on its periphery for said cable, said drum also having a helical means on its periphery for positioning spaced contact actuating members for controlling the energization of the driving motor.

26. In combination with an elevator car and an electric driving motor therefor, a control drum having a rotatable and axial movement and connected by a cable to the elevator car, the drum having a helical lead on its periphery for said cable, said drum also having a helix on its periphery for positioning spaced contact actuating cam members adapted to control the energization of the driving motor, the turns of said helix being interposed between the turns of said helical lead.

27. In combination with an elevator car and an electric driving motor therefor, of switching means actuated by movement of the car for controlling the circuit of the driving motor, and means for varying the time of actuation of said switching means in accordance with the power input to the driving motor and the direction of travel as the car approaches the desired floor.

28. In combination with an elevator car and an electric driving motor therefor, of switching means actuated by movement of the car and comprising an element carried by the car for controlling the circuit of the driving motor, and means for varying the position of said element to vary the time of actuation of said switching means in accordance with the power input to the driving motor and the direction of travel as the car approaches the desired floor.

29. In an electric elevator control system, means for deenergizing the driving motor when the car is at a predetermined distance from the landing level of a selected floor, comprising switch structure actuated in accordance with the movement of a torque motor having an armature adapted to exert a torque of varying magnitude dependent upon the power input to the driving motor, the direction of rotation of said armature depending upon the direction of travel of the elevator car, means for biasing the armature to a neutral position, and means for independently adjusting the bias in either direction of rotation to give different deflection constants.

30. In an electric elevator control system, means for deenergizing the driving motor when the car is at a predetermined distance from the landing level of a selected floor, comprising switch structure actuated in accordance with the movement of a torque motor having an armature adapted to exert a torque of varying magnitude dependent upon the power input to the driving motor, the direction of rotation of said armature depending upon the direction of travel of the elevator car, a rotatable arm connected to the armature and normally resiliently restrained to a neutral position by spring means acting on each side of the arm, and means for independently adjusting said spring means in either direction of rotation to give different deflection constants.

JOSEPH H. BORDEN.